(12) United States Patent
Quehin

(10) Patent No.: US 6,916,093 B2
(45) Date of Patent: Jul. 12, 2005

(54) ELASTIC HINGE HAVING A RADIAL STOP AGAINST EXCESSIVE OPENING

(75) Inventor: Sébastien Claude Quehin, Morez (FR)

(73) Assignee: Comotec, Les Rousses (FR)

(*) Notice: Subject to any disclaimer, the term of this patent is extended or adjusted under 35 U.S.C. 154(b) by 0 days.

(21) Appl. No.: 10/963,218

(22) Filed: Oct. 12, 2004

(65) Prior Publication Data
US 2005/0078272 A1 Apr. 14, 2005

Related U.S. Application Data

(63) Continuation of application No. PCT/FR03/00961, filed on Mar. 27, 2003.

(30) Foreign Application Priority Data

Apr. 12, 2002 (FR) .................................... 02 04568

(51) Int. Cl.$^7$ ................................................ G02C 5/22
(52) U.S. Cl. .......................... 351/153; 351/121; 16/228
(58) Field of Search .................................. 351/119, 121, 351/153; 16/228

(56) References Cited

U.S. PATENT DOCUMENTS 5,818,567 A * 10/1998 Sakai ........................... 351/153

6,481,053 B2 * 11/2002 Desbiez-Piat ................. 16/228

FOREIGN PATENT DOCUMENTS

| DE | 196 07 362 A1 | 9/1996 |
|---|---|---|
| EP | 0 239 010 A2 | 9/1987 |
| EP | 0 266 307 A1 | 5/1988 |
| EP | 0 889 347 A1 | 1/1999 |
| EP | 0 992 831 A1 | 4/2000 |
| EP | 1 146 381 A1 | 10/2001 |
| FR | 2 334 808 A | 7/1977 |
| WO | WO 98/44379 A1 | 10/1998 |
| WO | WO 01/79917 A1 | 10/2001 |

* cited by examiner

*Primary Examiner*—Huy Mai
(74) *Attorney, Agent, or Firm*—Akin Gump Strauss Hauer & Feld, LLP

(57) ABSTRACT

An elastic hinge (40), in particular for spectacle frames, has first and second hinge elements (50, 60) rotatably mounted around a pivot (45), a cam profile (53) integral with the first hinge element, a bearing piece (65) movably mounted in the second hinge element along an elastic translation axis. The bearing piece has a first contact area co-operating with the cam profile to give the hinge at least one stable position, and provides a lock for the hinge when a position of excessive opening is reached. The lock includes a protrusion (53-4) of the cam profile arranged for co-operating with a second contact area (65-2) of the bearing piece by exerting, essentially on the bearing piece, a force substantially perpendicular to the translation axis thereof.

16 Claims, 3 Drawing Sheets

ELASTIC HINGE HAVING A RADIAL STOP AGAINST EXCESSIVE OPENING

CROSS-REFERENCE TO RELATED APPLICATIONS

This application is a continuation of International Application No. PCT/FR03/00961, filed Mar. 27, 2003, which was published in the French language on Oct. 23, 2003, under International Publication No. WO 03/087917, the disclosure of which is incorporated herein by reference.

BACKGROUND OF THE INVENTION

The present invention relates to the field of spectacles and more particularly to hinges for spectacle frames.

More particularly, the present invention relates to an elastic hinge, particularly for spectacle frames, comprising two hinge elements rotatably mounted around a pivot, a cam profile integral with the first hinge element, a bearing piece movably mounted in the second hinge element along an elastic translation axis, having a first contact area for co-operating elastically with the cam profile and for giving the hinge at least one stable position, and a lock for the hinge when a position of excessive opening is reached.

The present invention particularly relates, in a hinge of the aforementioned type, to improvements of the lock for the hinge when a position of excessive opening is reached.

It is conventional to produce spectacle frame hinges having two stable positions owing to a bearing piece co-operating elastically with a cam profile. One stable position of the hinge corresponds to the closed position and the other corresponds to the open position of the arms of the frames. It is also conventional to provide a lock for the hinge when a so-called position of excessive opening is reached. The position of excessive opening corresponds to the open position of the spectacle arms to which an additional angle of opening, or angle of excessive opening, is added.

FIGS. 1, 2, 3 and 4 represent various conventional, elastic hinges equipped with a stop against excessive opening.

The hinge 10 represented in FIG. 1, described by European Patent EP 992,831, comprises two hinge elements 20, 30, a pivot 15 passing through the two hinge elements, a ball 31 slidably mounted in a cylindrical cavity 32 made in the second hinge element, and a cam profile 21 made at the proximal end of the first hinge element. A coil spring 33 arranged in the cavity 32 pushes the ball 31 against the cam profile 21. The latter has two hollows 21-1, 21-2 separated by a bump 21-3 for respectively giving a stable closed position and a stable open position to the hinge. The cam profile also comprises an protrusion 21-4 which, when the hinge is opened in excess of the position defined by the hollow 21-2, pushes the ball into the cavity 32 until it reaches a rear translation stop. The rear translation stop is here obtained by a reduction in the diameter of the cylindrical cavity, forming a shoulder preventing the ball from entering the lower part of the cavity where the spring is located. Another way of obtaining a rear translation stop involves ensuring that the spring reaches a state of maximum compression locking the translation of the ball in the cavity (so-called joined coil stop). As the ball 31 is locked, the protrusion 214 of the cam profile finds itself locked against the ball and the hinge cannot open in excess of the position of excessive opening thus determined.

The hinge 11 represented in FIG. 2, described by European Patent EP 889,347, comprises the aforementioned elements, designated by the same reference numerals. Thus, two hinge elements 20,30, a pivot 15, a ball 31 slidably mounted in a cavity 32 made in the second hinge element 30, a coil spring 33 and a cam profile 21 made on the first hinge element 20 can be seen. The cam profile also comprises two hollows 21-1, 21-2 separated by a bump 21-3 for obtaining the two aforementioned stable positions. The outer envelope of the second hinge element comprises two lips 34,35 between which the cam profile 21 is arranged (only the lip 34 being visible in FIG. 2). The outer envelope of the first hinge element comprises a V-shaped shoulder 22 arranged opposite the end of the lip 34. The locking of the hinge in position of excessive opening is here obtained by the fact that the end of the lip 34 comes up against a wing 22-1 of the shoulder 22, as can be seen in the FIG. 2.

The hinge 12 represented in FIG. 3, described by European Patent EP 266,307, comprises the aforementioned elements, designated by the same reference numerals. The locking of the hinge in a position of excessive opening is here obtained by the fact that the envelope of the first hinge element 20 comprises a protrusion 23 that co-operates with a cavity 36 provided in the second hinge element 30. The end of the protrusion 23 is flat and comes up against a flat wall that is at the bottom of the cavity 36 when the position of excessive opening is reached.

The hinge 13 represented in FIG. 4, described by International patent application publication WO 01/179917, comprises two hinge elements 20, 30, a pivot 15, a flat-top piston 37 slidably mounted in a cavity 32 made in the second hinge element 30, and a cam profile 24 provided at the proximal end of the first hinge element 20. A coil spring 33 arranged in the cavity 32 pushes the piston 37 against the cam profile 24. The latter has two flat sides 24-1, 24-2 co-operating with the flat top of the piston for obtaining the two aforementioned stable positions, and a fillet 24-3. In a position of excessive opening, the fillet 24-3 locks itself against the top of the piston 37, which finds itself in rear translation stop position. The rear translation stop is here obtained by the fact that a lower side 37-1 of the piston top comes up against a corresponding inner side 30-1 of the hinge element 30.

After all is said and done, two types of stops against excessive opening can be distinguished in previous practices.

The stops of the first type, or so-called axial stops, are implemented in the hinges represented in FIGS. 1 and 4. They involve locking the cam/bearing piece system, the bearing piece being a ball or a piston, and require providing a rear translation stop to lock the bearing piece.

The stops of the second type, or socalled radial stops, use specific contact surfaces provided on the outer envelopes of the hinge elements, as is the case in the hinges represented in FIGS. 2 and 3. In this case, the cam/bearing piece system only ensures the two stable positions are obtained and is not involved in locking the hinge.

The disadvantage of axial stops is that in a position of excessive opening, the areas of the bearing piece and the cam profile that are in contact are quite small. A high pressure is thus exerted on the contact areas when the user attempts to pull the arm of the spectacles beyond the position of excessive opening. This high pressure is likely to damage the cam profile.

Conversely, radial stops enable two flat surfaces to be put in contact, as can be seen in FIGS. 2 and 3, hence a better distribution of the excessive opening force and a weaker pressure exerted on the surfaces in contact. Furthermore, the excessive opening stress is not exerted on the contact areas of the bearing piece and of the cam profile. On the other hand, radial stops have a disadvantage in terms of style, due to the fact that the surfaces forming the stop are visible on the hinge elements and difficult to conceal. Radial stops therefore restrict the possibilities of designing hinges whose outer appearance is smooth and aesthetically pleasing, which constitutes a disadvantage in the field of spectacles in which style is of utmost importance.

BRIEF SUMMARY OF THE INVENTION

Thus, the present invention aims to provide an elastic hinge having a stop against excessive opening that enables the force of excessive opening to be correctly distributed over the surfaces in contact, while being capable of being concealed in the mechanism of the hinge and thus not being visible from the outside.

This object is achieved by providing an elastic hinge, in particular for spectacle frames, comprising two hinge elements rotatably mounted around a pivot, a cam profile integral with the first hinge element, a bearing piece movably mounted in the second hinge element along an elastic translation axis, having a first contact area for co-operating elastically with the cam profile and for giving the hinge at least one stable position, and a lock for the hinge when a position of excessive opening is reached, wherein the a lock for the hinge comprise an protrusion of the cam profile arranged for co-operating with a second contact area of the bearing piece by exerting, essentially on the bearing piece, a force perpendicular to its elastic translation axis, the protrusion of the cam profile forming a stop against excessive opening with the second contact area of the bearing piece.

According to one embodiment, the hinge does not comprise any rear translation stop acting on the bearing piece when the position of excessive opening is reached.

According to one embodiment, the protrusion of the cam profile has a flat edge co-operating with the second contact area of the bearing piece when the position of excessive opening is reached.

According to one embodiment, the bearing piece has a cylindrical wall co-operating with the protrusion of the cam profile when the position of excessive opening is reached.

According to one embodiment, the bearing piece has a proximal end of circular or spherical profile forming the first contact area that co-operates with the cam profile to give the hinge at least one stable position.

According to one embodiment, the bearing piece is a piston that is translation-mounted in a cylindrical cavity made in the second hinge element.

According to one embodiment, the piston comprises a first cylindrical part the edges of which co-operate with the protrusion of the cam profile to form the stop against excessive opening, and the end of which co-operates with the cam profile to give the hinge at least one stable position.

According to one embodiment, the piston comprises a second cylindrical part of diameter greater than that of the first cylindrical part, which co-operates with the walls of the cylindrical cavity to ensure the sliding and the trapping of the piston.

According to one embodiment, the piston is extended by a piston pin around which a coil spring is arranged that pushes the piston towards the cam profile.

According to one embodiment, the cylindrical cavity made in the second hinge element has a first section of a first diameter greater than that of the piston and a second section of a second diameter smaller than that of the piston, the piston being slidably mounted in the first section, the second section leading to the proximal end of the second hinge element, and the proximal end of the second hinge element comprises at least one slit revealing at least two lips.

According to one embodiment, the first and the second diameters and the lengths of the lips are determined so as to enable a method to be implemented for inserting the piston into the first section, comprising the step of forcing the piston to enter the second section with parting of the lips, and pushing the piston up to the first section, the piston finding itself trapped in the first section when the lips regain their initial parting.

According to one embodiment, the pivot passes through the lips of the second hinge element.

According to one embodiment, the first hinge element comprises a thin proximal end that bears the cam profile and is housed between the lips of the second hinge element.

According to one embodiment, the cam profile has two hollows for giving the hinge two stable positions by co-operation with the first contact area of the bearing piece.

The present invention also relates to spectacle frames comprising a frame and at least one arm, wherein the arm is connected to the frame by a hinge according to the present invention, the first hinge element being integral with the frame and the second hinge element integral with the arm, or vice-versa.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 5A:
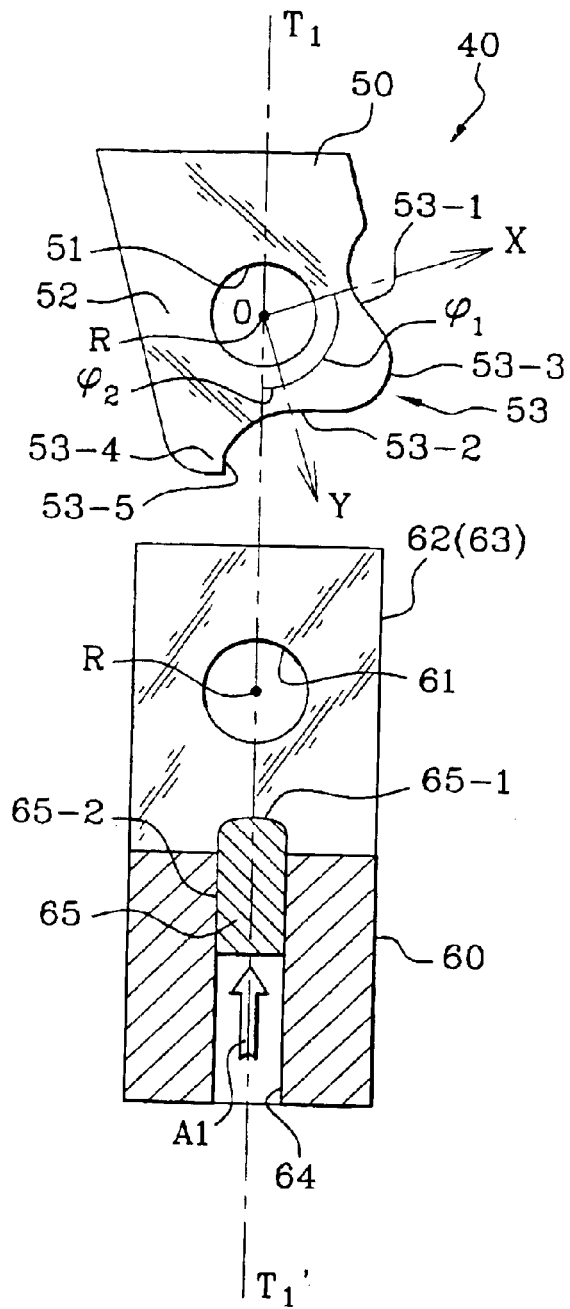
FIGS. 5A and 5B are respectively an exploded plan view and an assembled plan view, partially in section, of one simplified embodiment of a hinge according to the present invention.
Figure 5B:
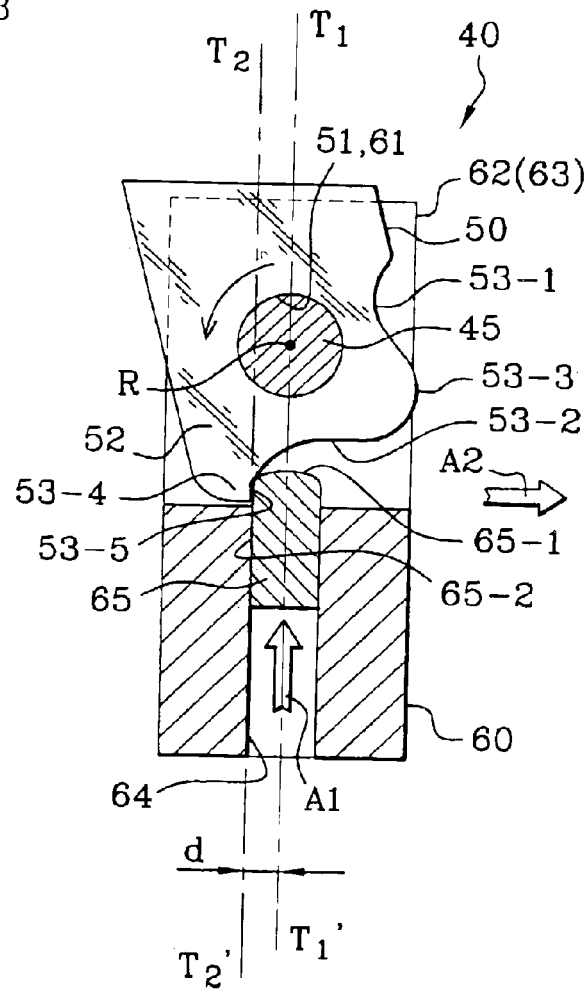

FIGS. 5A and 5B represent one simplified embodiment of an elastic hinge 40 according to the present invention, showing the principle of the present invention. The hinge 40 comprises a male hinge element 50, and a female hinge element 60. FIG. 5A is an exploded view of the hinge showing the hinge elements 50, 60 before assembly, and FIG. 5B shows the elements 50, 60 assembled by a pivot 45.

In these Figs., the element 60 is represented in section along a cutting plane perpendicular to the pivot 45.

The pivot 45 passes through knuckles 51, 61 (articulation apertures) made in the elements 50, 60. Each knuckle 51, 61 has a center coinciding with a mathematical axis R that goes through the center of the pivot 45, the axis R representing the axis of rotation of the hinge.

The element 50 comprises a proximal end 52 whose contour forms a cam profile 53. The cam profile 53 has a first hollow 53-1 and a second hollow 53-2 separated by a bump 53-3, and an protrusion 53-4 according to the present invention. By taking a point 0 on the axis of rotation R as reference point, the first hollow 53-1 is oriented along a normal OX of direction X perpendicular to the axis R and the second hollow 53-2 is oriented along a normal OX of direction Y perpendicular to the axis R. The normal OY has an angle φ1 in relation to the normal OX, here a 90° angle.

The proximal end of the element 60 has a slit revealing two lips 62, 63, only the lip 62 being visible in the cross-section view in FIGS. 5A, 5B. When the hinge 40 is assembled, as represented in FIG. 5B, the cam profile 53 of the element 50 is arranged between the lips 62, 63 of the element 60.

The element 60 comprises a cavity 64 with parallel walls, such as a cylindrical cavity for example, in which a bearing piece 65 is slidably mounted along a translation axis T1–T1' going through the axis of rotation R. The bearing piece 65 is pushed against the cam profile 53 by an elastic means A1 represented here by an arrow. It has a convex end 65-1 having a radius of curvature designed to co-operate with the radii of curvature of the hollows 53-1, 53-2 of the cam profile, the radii of curvature not necessarily being equal. Lengthwise, the bearing piece 65 has a lateral wall 65-2 parallel to the translation axis T1–T1'.

The protrusion 5-34 of the cam profile according to the present invention has an edge 53-5 provided for co-operating with the lateral wall 65-2 of the bearing piece, in a manner that will be described hereafter.

The elastic hinge according to the present invention has a first stable position when the normal OX is aligned with the translation axis T1–T1'. In this position, corresponding to the closed position of an arm of spectacle frames, the end 65-1 of the bearing piece 65 co-operates with the hollow 53-1 of the cam profile and ensures the stability of the closed position.

When the elements 50, 60 pivot in relation to one another by an angle equal to φ1, the bump 53-3 of the cam profile first of all pushes the bearing piece 65 into the cavity 64, against the elastic force A1 (phase of elastic resistance), then the bearing piece lodges in the hollow 53-2 (phase of elastic relaxation) while giving the hinge a second stable position corresponding to the open position.

When the hinge pivots by an angle φ2 in excess of the open position, the hinge reaches a position of excessive opening represented in Fig. 5B. In this position, the edge 53-5 of the protrusion 534 of the cam profile is up against the lateral wall 65-2 of the bearing piece 65. More particularly, in the position of excessive opening, the edge 53-5 is aligned with an axis T2–T2' that is here parallel to the translation axis T1–T1' of the bearing piece. The distance between the axis T2–T2' and the axis T1–T1' is equal to the half-width of the bearing piece, i.e., the semi-diameter of the bearing piece if this is cylindrical. The hinge is thus in the excessive opening stop position and the protrusion 53-4 of the cam profile exerts on the bearing piece 65 a force essentially perpendicular to the translation axis T1–T1', as represented by arrow A2 in FIG. 5B. The angle between the normal OY and the axis T1–T1' is then equal to the angle of excessive opening φ2.

Thus, according to the present invention, a stop against excessive opening is obtained by causing the cam profile 53 and the bearing piece 65 to co-operate in a direction perpendicular to the translation axis T1–T1' of the bearing piece, i.e., perpendicular to the elastic force A1 exerted on the bearing piece. It is therefore not necessary to provide a rear translation stop to lock the bearing piece when the position of excessive opening is reached, as the latter is not solicited in translation by the cam profile.

In other terms, the stop against excessive opening according to the present invention is a radial stop that does not use external means arranged on the envelopes of the hinge elements, but uses the bearing piece and the cam profile as a lock, like axial stops.

In practice, the present invention enables a good distribution of the force of excessive opening to be obtained by putting two areas in contact that are not point-shaped, such that the force exerted on the areas in contact can be properly distributed to obtain a limited pressure. The areas in contact are here the edge 53-5 of the protrusion 53-4 of the cam profile and an area of the lateral wall 65-2 of the bearing piece. The edge 53-5 can be flat and the lateral wall 65-5 of the bearing piece can be cylindrical. In this case, the edge 53-5 touches the lateral wall 65-5 tangentially and the theoretical mutual contact area is a line. In the event of wear or crushing, this mutual contact area tends to enlarge hence a better distribution of the pressure.

Figure 1:
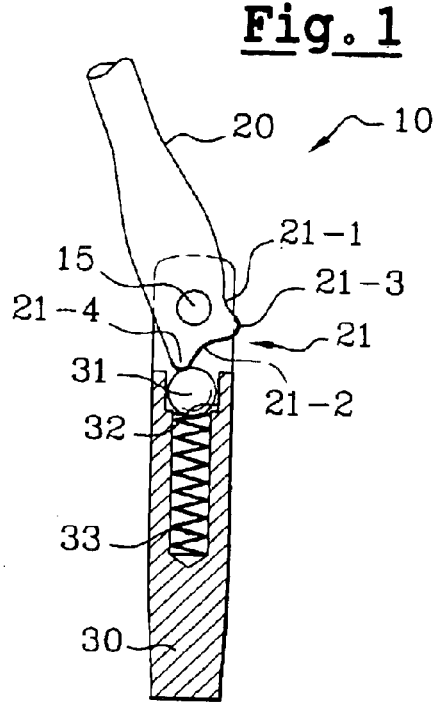
FIGS. 1, 2, 3 and 4, described above, are plan views, partially in section, of conventional elastic hinges equipped with a stop against excessive opening.
Figure 2:
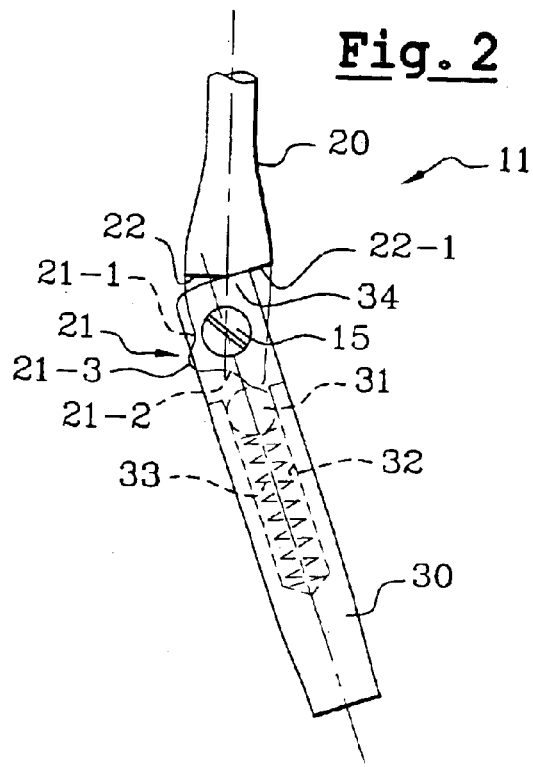
Figure 3:
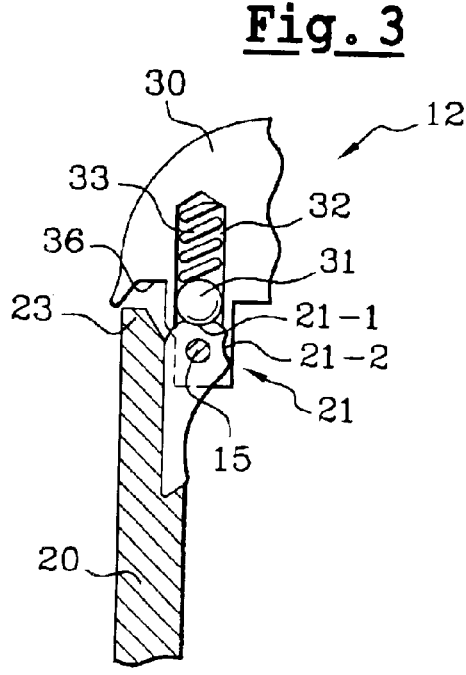
Figure 4:
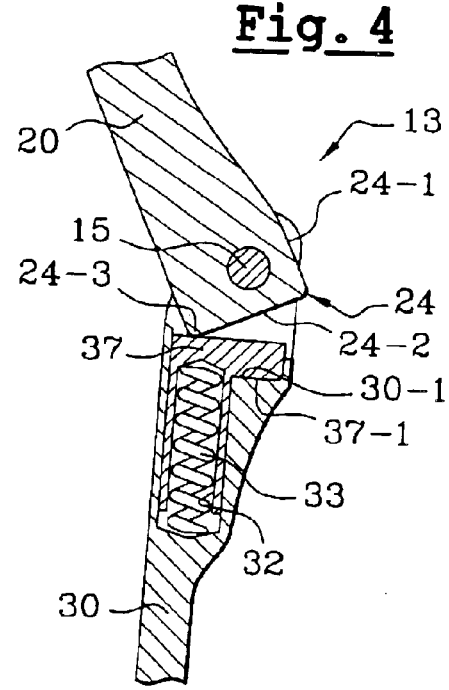

Furthermore, any wear or crushing of the areas in contact 53-5, 65-2 does not affect the end 65-1 of the bearing piece, which co-operates with the cam profile to obtain the two stable positions, unlike the axial stops represented in FIGS. 1 and 4.

Yet another advantage of this embodiment of the present invention is that a precise angle of excessive opening φ2 can be obtained while guaranteeing a low angular dispersion. This advantage is not found in axial stops with a ball and joined coil, which represent a majority of the elastic hinges available for sale. Indeed, the manufacturing tolerances of the springs are such that there is a substantial dispersion in the lengths of the springs when they are in maximum compression.

It will be understood that various alternative embodiments of the areas in contact in position of excessive opening may be made. For example, the lateral wall 65-2 of the bearing piece can have a complex profile (waves, saw teeth, etc.) in the zone co-operating in stop position with the edge 53-5 of the protrusion of the cam profile. In this case, the edge 53-5 has a corresponding profile, for a good distribution of the bearing force on the complex profile. Furthermore, the bearing piece can have a square or oval or other shape section instead of being cylindrical.

However, in the current state of the studies conducted by the applicant, the production of a bearing piece of cylindrical shape appears to be the simplest and most economical solution to implement the present invention. This will become apparent in the light of the description hereafter of one preferred embodiment of a hinge 41 according to the present invention, in connection with FIGS. 6 to 10.

In FIGS. 6 to 10 the reference numerals of the elements described above have been kept, except for that of the bearing piece, now designated by the reference numeral 66.

Figure 6:
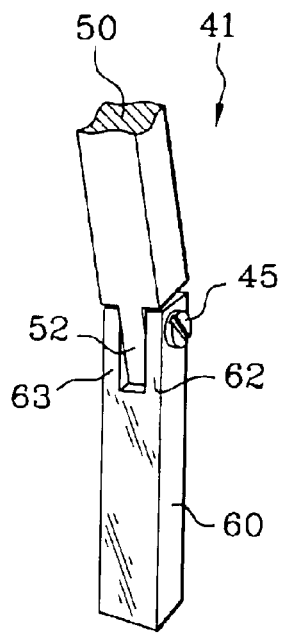
FIGS. 6 and 7 are respectively a perspective view and by a partial cross-sectional plan view of one preferred embodiment of a hinge according to the present invention.

FIG. 6 shows the hinge 41 seen from the outside and in perspective. The outer shape of the element 50 and that of the element 60 can be seen, as well as the lips 62, 63 of the element 60, which receive the proximal end 52 of the element 50, bearing the cam profile. The stop against excessive opening is not visible and various alternatives of the outer shape of the elements 50, 60 are possible in terms of style. The pivot 45 is here a screw passing through the lip 62, the element 50 and the lip 63. The screw co-operates with a thread or with a nut provided in the knuckle of the lip 63.

Figure 7:
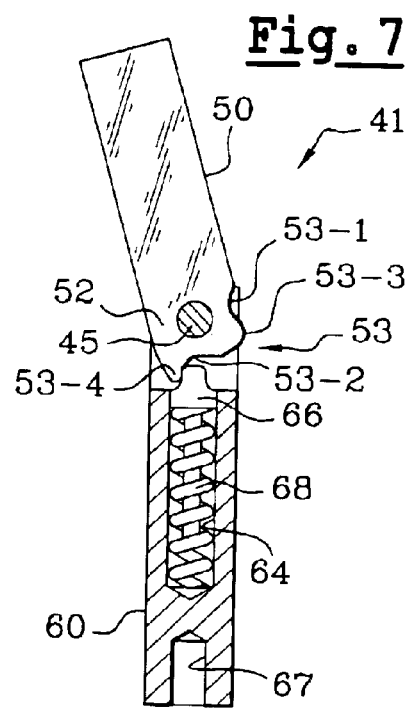

FIG. 7 represents the hinge 41 in a partial sectional view along a plane perpendicular to the pivot 45. At the distal end of the element 60, a cavity 67 can be seen which enables an arm of spectacle frames (not shown) to be mounted, the element 50 being fixed to the frame part of the spectacle frames (not shown). A reverse arrangement can also be provided, the element 50 thus being integral with the arm and the element 60 being integral with the frame part of the spectacle frames. The cavity 64 made in the element 60 receives a cylindrical bearing piece in the shape of a piston 66, which is pushed against the cam profile 53 by a coil spring 68.

Figure 8:
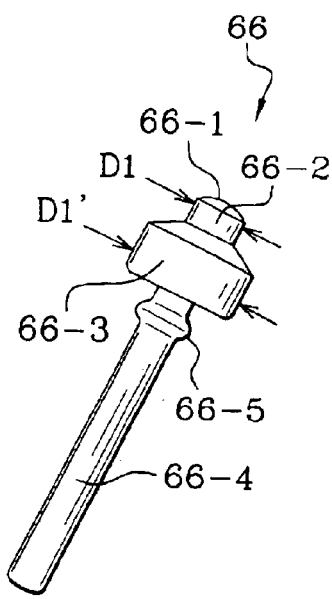
FIG. 8 is a side view of a bearing piece in the shape of a piston present in a hinge according to the present invention.

The shape of the piston 66 can be seen more clearly on FIG. 8. The piston comprises a spherical top 66-1 (portion of a sphere) arranged at the end of a cylindrical part 66-2 of diameter D1. The cylindrical part 66-2 forms the extension of a cylindrical part 66-3 of diameter D1' greater than D1, which co-operates with the walls of the cavity 64 to ensure the sliding of the piston. At the back of the piston 66 there is a piston pin 66-4 around which the spring 68 is arranged, a border 65-5 provided on the axis 664 enabling the end of the spring to be fixed by "clipping".

Figure 9:
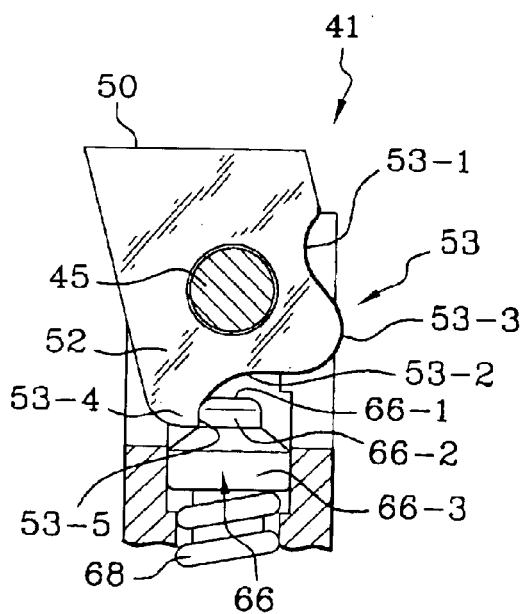
FIG. 9 is a partial cross-sectional plan view of one part of a hinge according to the present invention.

FIG. 9 is an expanded view of the area of co-operation of the piston 66 and the cam profile 53, along the same cutting plane as FIG. 7. The cam profile 53 is identical to the one described above in relation with FIGS. 5A, 5B, and the hinge is represented in position of excessive opening. It can be seen that the edge 53-5 of the protrusion 53-4 of the cam profile comes up against the cylindrical wall of the part 66-2 of the piston. Furthermore, it can also be seen that the spherical top 66-1 of the piston is designed to co-operate with the hollows 53-1, 53-2 and the bump 53-3 of the cam profile.

Figure 10:
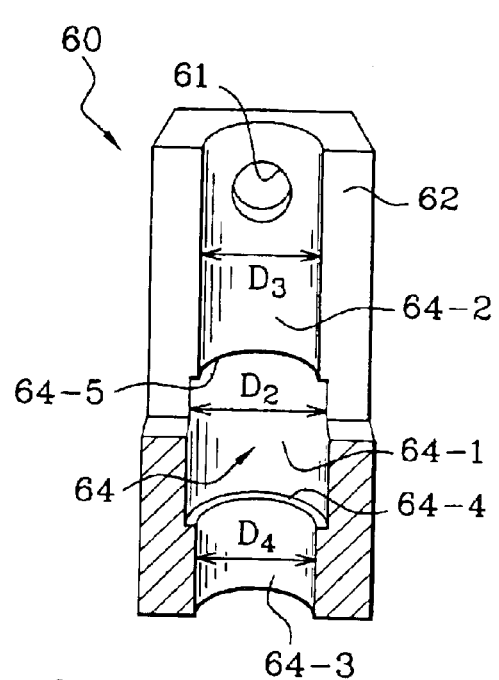
FIG. 10 is a cross-section view of a cavity for receiving the bearing piece in FIG. 8.

The arrangement of the piston in the cavity 64 is here performed by a method of elastic interlocking described by International patent application publication WO 01179917, implemented due to a particular shape of the cavity 64 that can be seen in FIG. 10. FIG. 10 represents the element 60 along the same cutting plane as FIGS. 7 and 9. The cavity 64, the lip 62 and the knuckle 61 made in the lip 62 can be seen. The cavity 64 comprises a first section 64-1 of diameter D2 designed to receive the part 66-3 of the piston 66 of greater diameter, D2 thus being substantially greater than D1'. In the vicinity of the proximal part of the element 60, and substantially after the start of the lip 62, the cavity 64 narrows and has a second section 64-2 of a diameter D3 substantially smaller than the diameter D1' and substantially greater than the diameter D1, which extends to the end of the element 60. Moreover, a section 64-3 of diameter D4 is provided at the other end of the cavity, for receiving the spring 68 and the pin 64-4 of the piston.

The piston is inserted into the section 64-1 through the section 64-2 of small diameter. After inserting the piston pin and the spring, the rear side of the piston is presented before the aperture formed by the section 64-2 and is inserted thereinto by force. The forced insertion of the piston causes the lips 62, 63 to part and the diameter D3 of the section 64-2 to increase. When the piston reaches the section 64-1 of greater diameter, the lips narrow and the section 64-2 regains its initial diameter D3. The piston thus finds itself trapped in the section 64-1, between a rear shoulder 64-4 due to the difference in diameter between the section 64-1 and the section 64-3, and a front shoulder 64-5 due to the difference in diameter between the section 64-1 and the section 64-2.

Note will be taken of the fact that providing a piston with a spherical top is an optional but advantageous aspect of the present invention. The spherical top of the piston, cooperating with the cam profile to obtain a bi-stable effect, provides the same advantages as a bearing piece in the shape of a ball, in terms of ease of use. Furthermore, the cylindrical body of the piston according to the present invention provides the conventional advantages of the bearing pieces in the shape of a piston, in terms of symmetry of the mechanism and guiding of the bearing piece. Better stability of the "ball"(i.e., here the spherical top of the piston) is also enjoyed due to the axial length of the piston.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. An elastic hinge, comprising:
    first and second hinge elements rotatably mounted around a pivot,
    a cam profile integral with the first hinge element,
    a bearing piece movably mounted in the second hinge element along an elastic translation axis, having a first contact area for co-operating elastically with the cam profile and for giving the hinge at least one stable position, and
    a lock for the hinge when a position of excessive opening is reached,
    wherein the lock for the hinge comprises a protrusion of the cam profile arranged for co-operating with a second contact area of the bearing piece by exerting, essentially on the bearing piece, a force perpendicular to an elastic translation axis of the bearing piece, the protrusion of the cam profile forming with the second contact area of the bearing piece a stop against excessive opening.

2. The hinge according to claim 1, not comprising any rear translation stop acting on the bearing piece when the position of excessive opening is reached.

3. The hinge according to claim 1, wherein the protrusion of the cam profile has a flat edge co-operating with the second contact area of the bearing piece when the position of excessive opening is reached.

4. The hinge according to claim 1, wherein the bearing piece has a cylindrical wall co-operating with the protrusion of the cam profile when the position of excessive opening is reached.

5. The hinge according to claim 4, wherein the bearing piece has a proximal end of circular or spherical profile forming the first contact area that co-operates with the cam profile to give the hinge at least one stable position.

6. The hinge according to claim 1, wherein the bearing piece is a piston translation-mounted in a cylindrical cavity in the second hinge element.

7. The hinge according to claim 6, wherein the piston comprises a first cylindrical part whose edges co-operate with the protrusion of the cam profile to form the stop against excessive opening, and whose end co-operates with the cam profile to give the hinge at least one stable position.

8. The hinge according to claim 7, wherein the piston comprises a second cylindrical part having a diameter greater than a diameter of the first cylindrical part, the second cylindrical part co-operating with walls of the cylindrical cavity to ensure sliding and trapping of the piston.

9. The hinge according to claim 6, wherein the piston has an extension in a form of a piston pin around which a coil spring is arranged, the coil spring pushing the piston towards the cam profile.

10. The hinge according to claim 6, wherein:
the cylindrical cavity in the second hinge element has a first section having a first diameter greater than a diameter of the piston and a second section having a second diameter smaller than the diameter of the piston, the piston being slidably mounted in the first section, the second section leading to a proximal end of the second hinge element, and
the proximal end of the second hinge element comprising at least one slit revealing at least two lips.

11. The hinge according to claim 10, wherein the first diameter and the second diameter and lengths of the lips are determined so as to enable insertion of the piston into the first section, the insertion comprising forcing the piston to enter the second section with parting of the lips, and pushing the piston up to the first section, whereby the piston is trapped in the first section when the lips regain their initial position.

12. The hinge according to claim 10, wherein the pivot passes through the lips of the second hinge element.

13. The hinge according to claim 12, wherein the first hinge element comprises a thin proximal end that bears the cam profile and is housed between the lips of the second hinge element.

14. The hinge according to claim 1, wherein the cam profile has two hollows for providing the hinge with two stable positions by co-operation with the first contact area of the bearing piece.

15. Spectacle frames comprising a frame and at least one arm, wherein the arm is connected to the frame by a hinge according to claim 1, the first hinge element being integral with the frame and the second hinge element being integral with the arm, or vice-versa.

16. The hinge according to claim 1, wherein the hinge is a part of a spectacle frame.

* * * * *

UNITED STATES PATENT AND TRADEMARK OFFICE
CERTIFICATE OF CORRECTION

PATENT NO. : 6,916,093 B2
DATED : July 12, 2005
INVENTOR(S) : Sebastien Claude Quehin It is certified that error appears in the above-identified patent and that said Letters Patent is hereby corrected as shown below:

Column 1,
Line 62, "214" should read -- 21-4 --;

Column 2,
Line 26, "WO 01/179917" should read -- WO 01/79917 --;
Line 50, "socalled" should read -- so-called --;

Column 5,
Line 15, "OX" should read -- OY --;
Line 35, "5-34" should read -- 53-4 --;
Line 56, "Fig. SB" should read -- Fig. 5B --;
Line 57, "534" should read -- 53-4 --;

Column 7,
Line 29, "664" should read -- 66-4 --;
Line 44, "WO 01179917" should read -- WO 01/79917 --.

Signed and Sealed this

Eighteenth Day of October, 2005

JON W. DUDAS
*Director of the United States Patent and Trademark Office*